United States Patent [19]

Hough

[11] Patent Number: 4,604,694
[45] Date of Patent: Aug. 5, 1986

[54] SHARED AND EXCLUSIVE ACCESS CONTROL

[75] Inventor: Roger E. Hough, Highland, N.Y.

[73] Assignee: International Business Machines Corporation, Armonk, N.Y.

[21] Appl. No.: 561,613

[22] Filed: Dec. 14, 1983

[51] Int. Cl.[4] .............................................. G06F 9/46
[52] U.S. Cl. .................................... 364/200; 364/300
[58] Field of Search ................ 364/300, 200 MS File, 364/900 MS File

[56] References Cited

U.S. PATENT DOCUMENTS

| | | | |
|---|---|---|---|
| 3,886,525 | 5/1975 | Brown et al. | 364/200 |
| 4,271,468 | 6/1981 | Christensen et al. | 364/200 |
| 4,399,504 | 8/1983 | Obermarck et al. | 364/200 |
| 4,400,773 | 8/1983 | Brown et al. | 364/200 |
| 4,480,304 | 10/1984 | Carr et al. | 364/200 |
| 4,482,956 | 11/1984 | Tallman | 364/300 |

OTHER PUBLICATIONS

"Share Locking without a Lock" by Taradalsky, IBM Tech. Discl. Bull., vol. 18, No. 5, Oct. 1975, p. 1546.
"FIFO Queuing Technique Using Compare and Swap" by Taradalsky, IBM Tech. Discl. Bull., vol. 18, No. 5, Oct. 1975, pp. 1547-1548.

*Primary Examiner*—James D. Thomas
*Assistant Examiner*—Thomas Lee
*Attorney, Agent, or Firm*—Bernard M. Goldman

[57] ABSTRACT

A method for controlling both shared and exclusive access for a resource in a multiprocessor system wherein a first-in/first-out queue is formed for tasks suspended while awaiting access and wherein access to the resource provides that control of access required for manipulation of the first-in/first-out queue which is not provided by the atomic nature of compare (double) and swap. Each member of the queue has indicators of the access it requested and of the next most recently enqueued member which has a corresponding indicator. A lockword is established having two parts, a lock flag indicating the status of the resource, whether available, under shared ownership or under exclusive ownership and a lock pointer pointing to the most recently enqueued task. In requesting or releasing access, an initial guess is made as to the value of the lockword and a projected lockword is calculated based on the guess. Then an atomic reference is made to the lockword during which no other multiprocessor has access to the lockword. During the atomic reference, the lockword is compared to the guess of the lockword and if the guess is correct, the lockword is replaced by the projected lockword which rearranges the queue for the requesting or releasing task. If the guess was incorrect, the value of the lockword is used to calculate another projected lockword. If another task can affect the next tasks to gain access, the process with the atomic reference is repeated until no intervening changes occur between atomic references.

27 Claims, 13 Drawing Figures

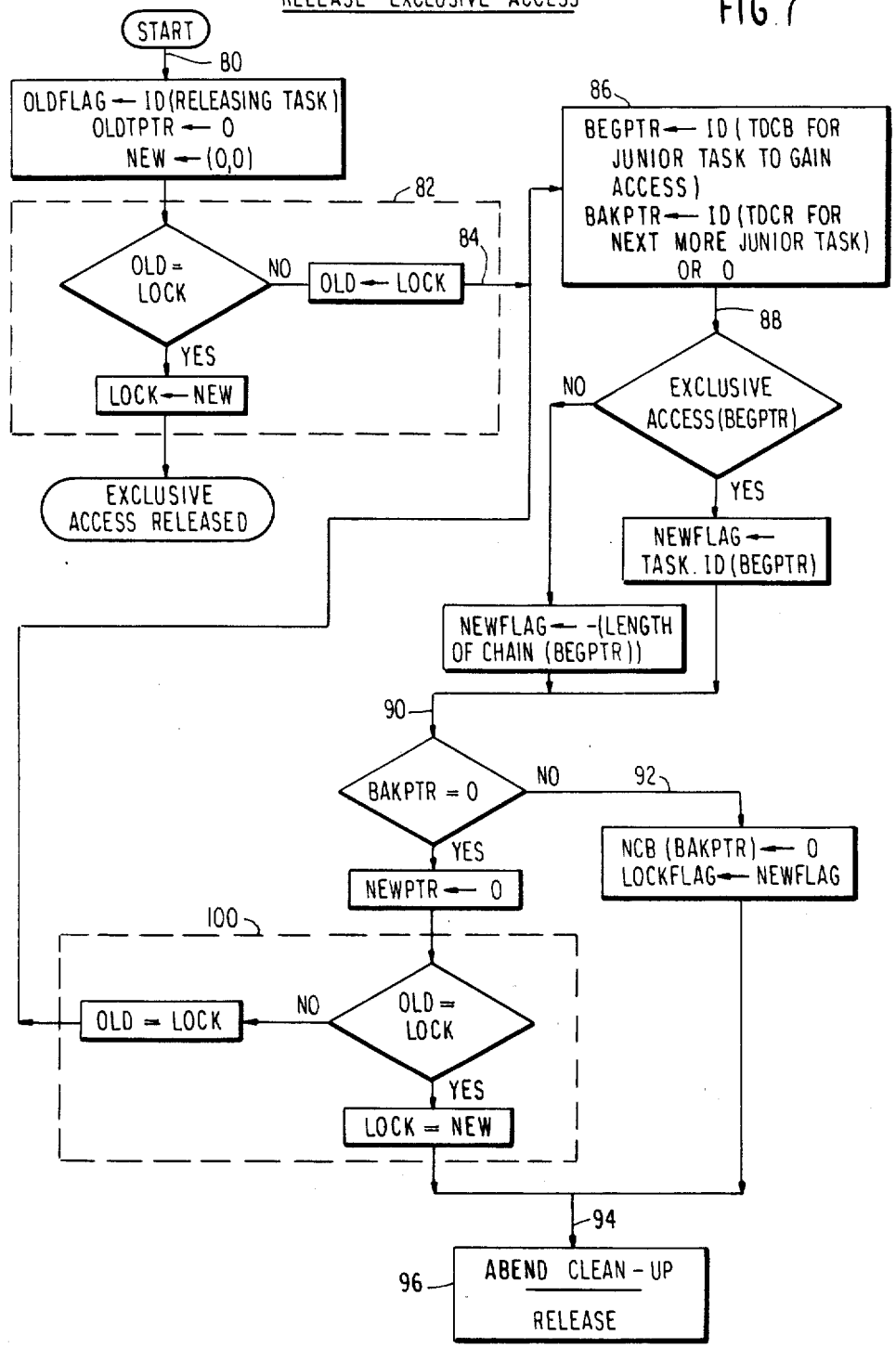
FIG.7 RELEASE EXCLUSIVE ACCESS

SHARED AND EXCLUSIVE ACCESS CONTROL

BACKGROUND OF THE INVENTION

The invention relates generally to the use of lockwords for establishing control and queuing in a multitask computer environment and, in particular, relates to task locking that avoids spin locking.

In a computer system involving only a single processor executing a single task at any time, the control of computer resources presents no problem. The type of resources being referred to can be mass memories, tape drives, printers or communication channels, although other types of resources are understood to exist. Only one task exists to have access to any resource and maintains its control over all the any resource as well as the central processing unit until the requested resource has completed its activity.

However, multi-tasking and multiprocessor systems have become popular which allow simultaneous or interleaved execution of multiple tasks with the resources somehow shared between the simultaneously executing tasks. Some resources like a printer or a tape drive operate such that the requesting task requires exclusive access to that resource for at least some period. Other resources, such as parts of a common storage area, may be shared among various tasks. In order to arrange controlled access to a resource, a queue is set up for all tasks that have requested access to a resource but are not granted immediate access. The queue must further contain the information as to whether a task in the queue is requesting shared or exclusive access of the resource and whether the resource is currently being used on a shared or exclusive basis.

Thus, when a task requests access to a resource but is refused immediate access, the operating system rearranges the queue to reflect the addition of the requesting task to the queue. However in a multi-tasking environment, the possibility always exists that two or more tasks will request access to a particular resource at almost the same time and, if not prevented, will proceed to rearrange the queue concurrently. This rearrangement largely involves serializing the queue, that is, setting up an ordered list of who is in the queue. If this rearrangement is being performed concurrently by two different tasks, one of the requesting tasks may not join the queue or, even worse, the entire organization of the queue will be destroyed.

In order to avoid these problems, a lockword is established for each resource. If the queue for that resource is currently being rearranged, the lockword indicates this fact, and the operating system prevents a second task from manipulating the queue. However, if the lockword indicates that no queue manipulations are in progress, then the requesting task first changes the lockword to assert ownership of queue manipulations for that resource and proceeds to rearrange the queue according to its requirements.

At the end of the queue manipulation, the lockword is reset to a state indicating that no queue manipulation is currently in progress.

To avoid all possibility of two tasks concurrently rearranging the queue, the initial testing and setting of the lockword must be performed such that only a single task can at any time be performing this pair of operations.

In an IBM System/370, designed for a multi-tasking environment, there is a test and set instruction which can fetch a word from memory, test for a specific bit and return a modified word to the memory, all during one operation in which all other tasks or processors are barred from accessing that particular word in memory. The fetch and return-store forms an atomic unit or atomic reference which, once begun, cannot be interrupted by or interleaved with any other CPU in a multiprocessor. The test and set instruction can therefore be used to test a lockword and to set it for ownership. The set of operations is described in Table 1 in which one bit of the byte LOCKWORD is tested for zero, indicating availability of the lockword. LOCKWORD is immediately rewritten with this bit set to a "1". The result of this testing is retained and used in the next step by a conditional branch BC. If the testing was not successful, i.e, the lockword was owned by another task or processor, execution branches back to retry, the test and set operation. When the lockword is available and ownership of the lockword is established, a series of operations are performed in which the queue is manipulated by this requesting task or processor. While this manipulation is proceeding, no other task can manipulate the queue because this task owns the lockword. When the manipulation has been completed, a final instruction rewrites the lockword to indicate that it is once more available. LOCKWORD is set to zero, indicating that the queue is once more available to other requesting tasks or processors.

TABLE 1

| retry | TS | LOCKWORD |
|---|---|---|
| | BC | CC1,retry |
| | . | . |
| | . | . |
| | . | . |
| | alter | queue |
| | . | . |
| | . | . |
| | MVI | LOCKWORD, 0 |
| | SPIN-LOCK | |

The above series of operations is called spin-locking because, if a task cannot gain ownership of a lockword, it keeps spinning or trying to obtain such ownership until the using task finally relinquishes control. Such spinning is wasteful and in some situations can severely degrade the throughput of a multi-tasking computer. A particularly bad situation occurs if one processor is in spinlock because a second processor owns the lockword and then the second processor fails before it relinquishes the lockword. In this case, the first processor continues to spin for an indefinite time because of the failure of another processor.

A pictorial illustration of the hierarchy involved in task locking implemented with test and set is shown in FIG. 1 (A). Test-and-set is too primitive to provide direct identification of the owning task or processor for a lockword when a CPU failure occurs or to provide more than one owner of a resource. For this reason, test-and-set is used to control manipulation of small queues, which may consist of single elements, that in turn control the manipulation and examination of other queues. These elements allow the identification of the task or processor owning the queue when a CPU failure occurs and provide the ability for more than one task to have ownership of a queue at the same time, as might be useful for tasks which examine a queue without altering it.

The enhanced spin locks are, in turn, used to control the manipulation of queues for which tasks, but not processors, are suspended until the required availability. Requests which allow concurrent ownership to others are called "shared" requests. Requests which allow no other component ownership are called "exclusive" requests. Requests which cause the task to be suspended without suspension of a processor are called "task locks".

The first level of task locks provides control for resources and queues on which the operating system is dependent for its continued operation. These are called "supervisor task locks", since they are available only to supervisory programming.

One of the supervisor task locks is used, in turn, to control the manipulation of queues which provide control for resources and queues on which the operating system is not dependent for its continued operation. These are called "application task locks", since they are available to any programming.

The importance of the hierarchy is that application task locking requires four levels of operations. The multiplicity of levels produces a complex and slowly operating system.

An important capability of the System/370 series of processors is made possible by two instructions, named "compare and swap" and "compare double and swap". The two instructions differ only in that compare and swap operates on single length words, while compare double and swap operates on double length words. As used here, a word is four bytes (thirty-two bits) long while double words are twice that length. Because the embodiment to be described later uses double words, only compare double and swap is described.

The compare double and swap or CDS operates on three operands so that it assumes the form of CDS (OLD, NEW, LOCK), where OLD, NEW and LOCK are double length words. The effect of CDS is illustrated in FIG. 2. If the value of LOCK equals or matches the value of OLD, the LOCK is replaced with the value of NEW; however, if LOCK does not match OLD, then OLD is replaced with LOCK and LOCK remains unchanged. A condition code CC is set depending on the outcome of the test for LOCK=OLD. This condition code can be used to separate the operational flow depending on the success of the test.

The CDS operation shares the attribute with test and set that it is an atomic reference. That is, it fetches and stores back into memory in a single operation that cannot be interrupted by any other processor. Although, FIG. 2 shows five operations, CDS is accomplished as though it were a single operation. This atomic character, coupled with its similarity to test and set, allows CDS to replace the test-and-set operation in a supervisor spin exclusive. Indeed means have been described elsewhere to use compare double and swap in both a supervisor spin share and a supervisor task exclusive. These possible uses of CDS are shown in the hierarchy shown in FIG. 1(B). The result is that for exclusive tasks, only three levels of operations are required for application task locking. Until now, shared access task locking has required the use of a supervisor spin or exclusive task lock to control access to the controls which, in turn, are used to provide shared access and coordinate shared access with exclusive access requests for the same queues or resources Because the suspension and resumption of a task cannot itself be suspended and resumed as a task, the lock which controls its queues must necessarily be a spin lock. If this spin lock is not the same lock used to control access to the controls used to provide shared access, another level of locking may be introduced when a task must be suspended or resumed for the lack of availability or the reappearance of availability of a resource. These three levels are an improvement over the four levels required with test and set. However, the three levels still introduce system complexity with shared tasks. Furthermore, they contribute to unwanted system complexity and slow its operation.

SUMMARY OF THE INVENTION

Accordingly, an object of this invention is to provide task locking with a minimum level of operations between the instruction set and the application task locking.

A further object of the invention is to provide shared and exclusive task locking that as much as possible avoids the use of other locks.

The invention can be summarized as a method of providing task locking for any combination of tasks requesting either shared or exclusive access to a resource. A first-in/first-out queue is created by control blocks indicating both the type of access requested and a pointer to the next previously enqueued control block. A lockword controls access to the queue of the resource and indicates both the present use of the resource and a pointer to the most recently enqueued task in the queue. Methods using the atomic operation, compare double and swap, allow a task requesting either exclusive or shared access of the resource to be enqueued and allow tasks releasing either exclusive or shared access to the resource to suitably rearrange the queue and prepare access to the resource for other tasks.

BRIEF DESCRIPTION OF THE DRAWINGS

FIG. 7 is a flow diagram of the processing of a release of exclusive ownership of a resource;

DETAILED DESCRIPTION OF THE INVENTION

Figure 3:
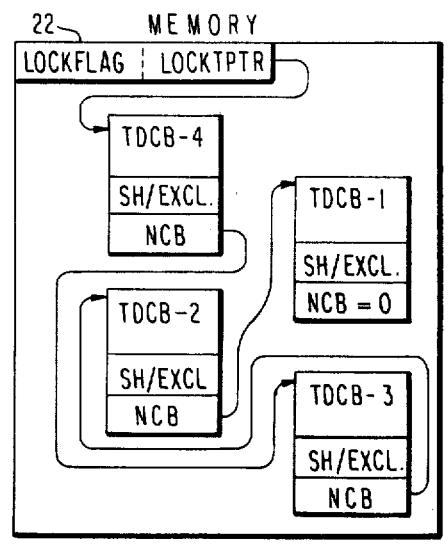
FIG. 3 is a pictorial representation of a queue for a resource as used in this invention.

The architecture of the task locking according to this invention will be described with reference to the block diagram of FIG. 3. If one or more tasks has requested access to a resource but their requests cannot be honored, then the request is put into a queue. The first queue request can be rejected because the task currently executing on the resource is a task requiring exclusive access to that resource or the requesting task can itself be requesting exclusive access when the resource is already owned either exclusively or shared. If the resource is not currently busy, a request is immediately honored and no queue is formed. In the absence of a queue, if one or more tasks currently have shared access to the resource, than an additional request for shared access is immediately honored and there is no reason to form a queue. The queue will have the architecture of a first-in/first-out queue. That is, a request for access to the resource is honored for the oldest or least recently submitted request before a more recent request is honored. This means that if an older request is a request for exclusive access, a more recent request for shared access will be denied, even if the resource is currently being used with shared access. If the resource is currently in use for shared access, then the top of the queue or the least recently enqueued task will necessarily be a request for exclusive access. Previously submitted requests for shared access would have been honored and the associated task removed from the queue. However, requests for shared access, less senior than an enqueued exclusive request, may be in the queue. The queue is formed of a series of task deferral control blocks (TDCB) arranged at arbitrary locations in a memory 22 of the multi-processor system. It should be noted that the resource may also be a part of the memory 22. A separate task deferral control block is set up for each task that has been suspended because a request for access to the resource has been denied. Each task deferral control block contains a variety of information. It must contain all information required to resume the suspended task, such as a pointer to the task or a control program event control block to be posted. It must also contain an indication specifying whether shared or exclusive access SH/EXCL was requested for this task. Of course this indication can be omitted if only one form of access is permitted. Finally, for the purposes of this invention, it contains a pointer NCB to the next most recently enqueued task deferral control block, if any. The NCB of the top, least recently queued elements of the queue is set to zero.

The lockword is a double word (LOCK=LOCKFLAG: LOCKTPTR) and is stored at a fixed position within the memory 22. The lockword controls access to the resource and to the queue for the tasks awaiting access to the resource. The first half LOCKFLAG of the lockword indicates the current usage of the resource. If the resource is not currently in use and no task has access to it, LOCKFLAG=0. If the resource is currently held shared, LOCKFLAG is the negative of the number of tasks which have shared access to the resource. If the resource is currently held exclusively, LOCKFLAG is a positive number, which may further designate the exclusively owning task. The second word LOCKTPTR of the double word LOCK is a pointer to the task deferral control block of the most recently enqueued task. If there are no enqueued tasks, i.e. no queue, then LOCKTPTR=0. Thus, LOCKTPTR points to the most recently enqueued task deferral control block.

The queue as described has a dynamic architecture. If the senior member of the queue is given access to the resource, its task deferral control block TDCB-1 may be de-allocated from the memory 22. Then the NCB of the next least recently enqueued task TDCB-2 is set to zero, indicating that TDCB-2 is now at the top of the queue. Also, the first word LOCKFLAG of the lockword is reset to reflect the new status of the resource. If another task is to join the queue, another task deferral control block is allocated and the second word LOCKTPTR of the lockword is set to point to this newly allocated task deferral control block. The NCB of this new task deferral control block is set to point to the task deferral control block of the next recently enqueued task, TDCB-4 in the example.

According to the invention, any task wishing to rearrange the queue because it is requesting or releasing access to the resource, makes a guess as to what the present lockword is and forms a new potential lockword NEW based on its guessed lockword. In a compare double and swap, the task causes the guess lockword to be compared with the present lockword LOCK. If the guess was correct, then the present lockword is replaced by the new lockword NEW and the rearrangement has been accomplished. Because of the atomic nature of the compare double and swap, the rearrangement is accomplished while other tasks on other multiprocessors are barred from access for modifying the lockword.

However, if the guess at the present lockword was incorrect, the actual value of LOCK is used to produce a potential NEW lockword. Then the compare double and swap is repeated and, presuming no other task has in the meantime rearranged the queue and modified the lockword LOCK, the subsequent compare double and swap rearranges the queue.

Figure 2:
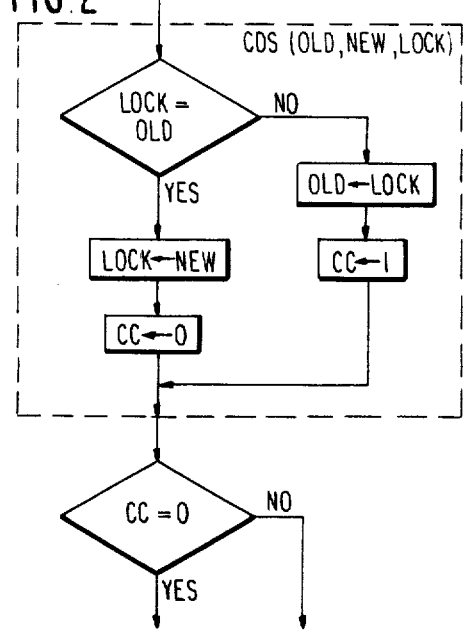
FIG. 2 is a flow diagram of the atomic operation compare double and swap.

An embodiment of the invention will be described for four different situations when the resource can be used exclusively by one task or can be shared among multiple tasks: a request for exclusive access, a request for shared access, a release of exclusive access and a release of shared access. In this discussion, the double-word lockword contains two single words, LOCK=LOCKFLAG: LOCKTPTR. Both the double-word and single-word representations will be used depending on the operation. Likewise, the predicted new lock-word NEW is a double-word consisting of two single words, NEW=NEWFLAG: NEWTPTR. Similarly, the fetched value of the lockword OLD=OLDFLAG: OLDTPTR. In the flow diagrams, the conditional branch on the condition code CC in FIG. 2 will be implicitly included in the compare double and swap so that the exit from that operation assumes one of two paths, depending on the outcome of the comparison of LOCK with OLD.

Figure 4:
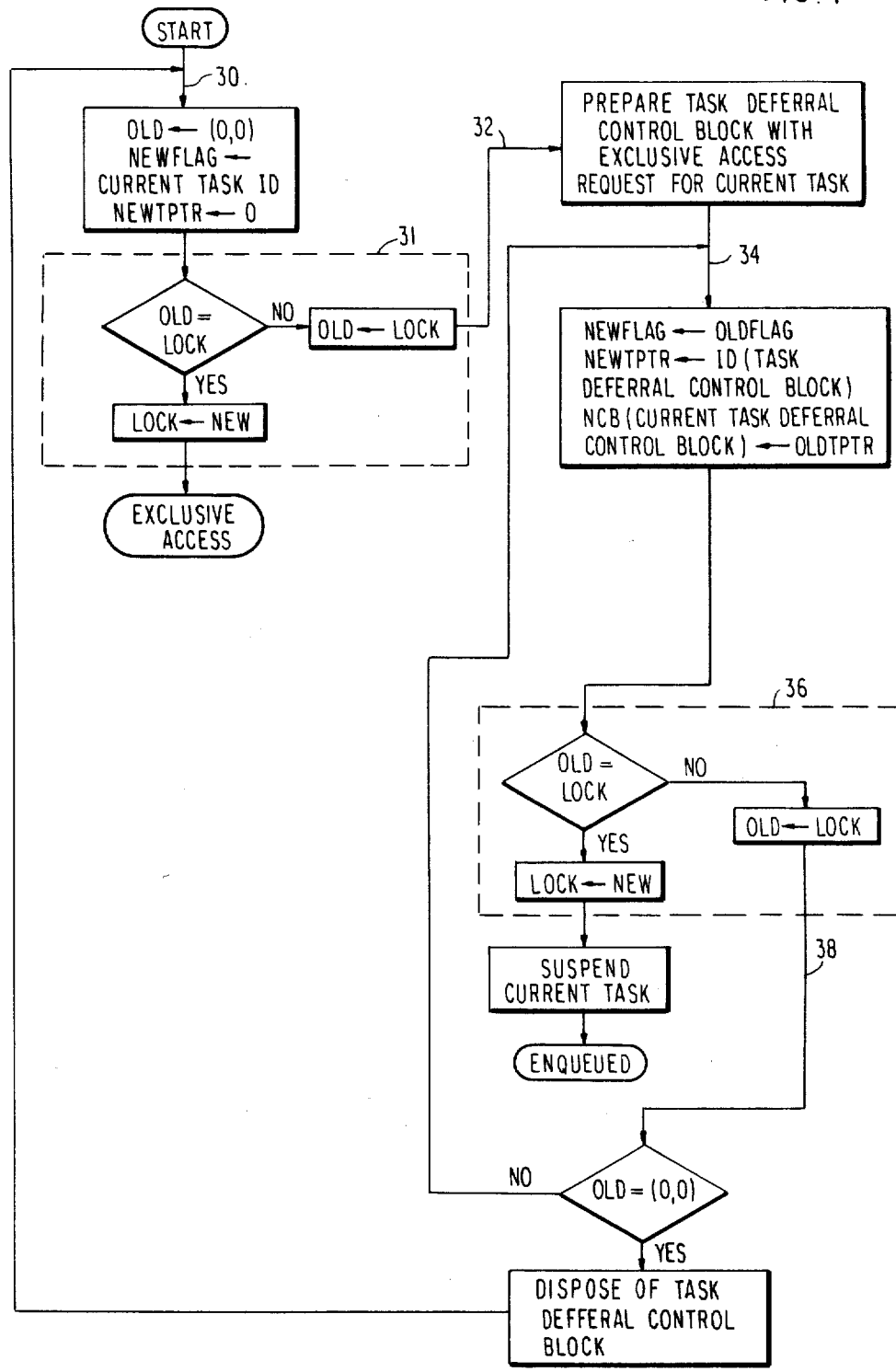
FIG. 4 is a flow diagram of the processing of a request for exclusive access to a resource.

The method for processing a request from a task for exclusive access is shown in the flow diagram of FIG. 4. The process starts from point 30. An initial guess is made that the resource is not currently in use so that the value of LOCK is predicted to be (0, 0). This value is stored in the double-word OLD. If this is true, then the requesting task can gain immediate access to the resource, in which case LOCKFLAG would be set to designate this requesting task as exclusive owner and LOCKTPTR would be set to zero indicating that no other tasks are enqueued. If in fact a queue presently exists, the resource must necessarily be in use. These new values for the lock-word are set respectively into NEWFLAG and NEWTPTR. Then the atomic reference compare double and swap 31 is executed. The lockword LOCK is fetched and compared with the double-word OLD. If the two values match, then the prediction is correct and LOCK is replaced with the value of NEW and exclusive access has been gained to the resource. In this case, no queue previously existed and no queue needs to be created because the requesting tank has not been deferred.

However, if OLD does not match LOCK, then the prediction of an available resource is untrue. Then the current value of the lockword is stored in OLD. It is to be once more emphasized that compare double and swap is an atomic reference so that if the prediction was true at the beginning of the execution of CDS, then access was gained to the resource without another multiprocessor being able to change the situation in the middle of the operation. Likewise, the value of LOCK that is stored in OLD is the value at the beginning of the execution of CDS.

If the resource is not now available for exclusive access, execution of the request reaches point 32 and preparations are made for putting the current or requesting task into a queue. A task deferral control block is prepared and the contents of this block are set up for the current task along with an indication that it is a request for exclusive access. Preparations are made to put the current task into the queue, which previously may not have existed. At this point 34, the best current prediction for the value of the lockword is the value OLD obtained in the compare double and swap 31. The value of LOCKFLAG would not change if the current task is put in the queue so NEWFLAG is replaced by OLDFLAG. However, the updated LOCKTPTR would point to the current task which upon enqueuing would be the most recently enqueued task. The NCB of the task deferral control block for the current task would point to the task deferral control block pointed to by the previous LOCKTPTR, at that time the most recently enqueued task. Accordingly, the value of NEWTPTR is replaced with the identification, normally the address, of the task deferral control block of the current requesting task and the next block pointer NCB in the current task deferral control block is replaced with the value of OLDTPTR. Then another atomic reference 36 in a compare double and swap is performed. If the lockword remains as it previously was so that OLD=LOCK, then LOCK is replaced with NEW and the current task is placed in the queue with the pointers corrected for the correspondingly rearranged queue. The execution of the current task is suspended as it awaits access to the resource and the task is enqueued. If, however, since the last compare double and swap 31, some other task has rearranged the queue by modifying the lockword, then OLD does not match LOCK and the current value of LOCK is placed into OLD.

At this point 38, a decision is made as to whether the change in state is due to the resource becoming available or whether the resource is again unavailable but the queue has been rearranged. If OLD=(0, 0), then the best guess is that the resource is now available so that it is no longer necessary to form a queue. The space for the task deferral control block for the current task is de-allocated if necessary, and execution returns to the start 30. However, if OLD≠(0, 0), then a change has been made to the queue but the resource is not available. Execution then returns to point 34 with the value of OLD having been obtained from the compare double and swap of the recent atomic reference 36 rather than first atomic reference 31.

Figure 5:
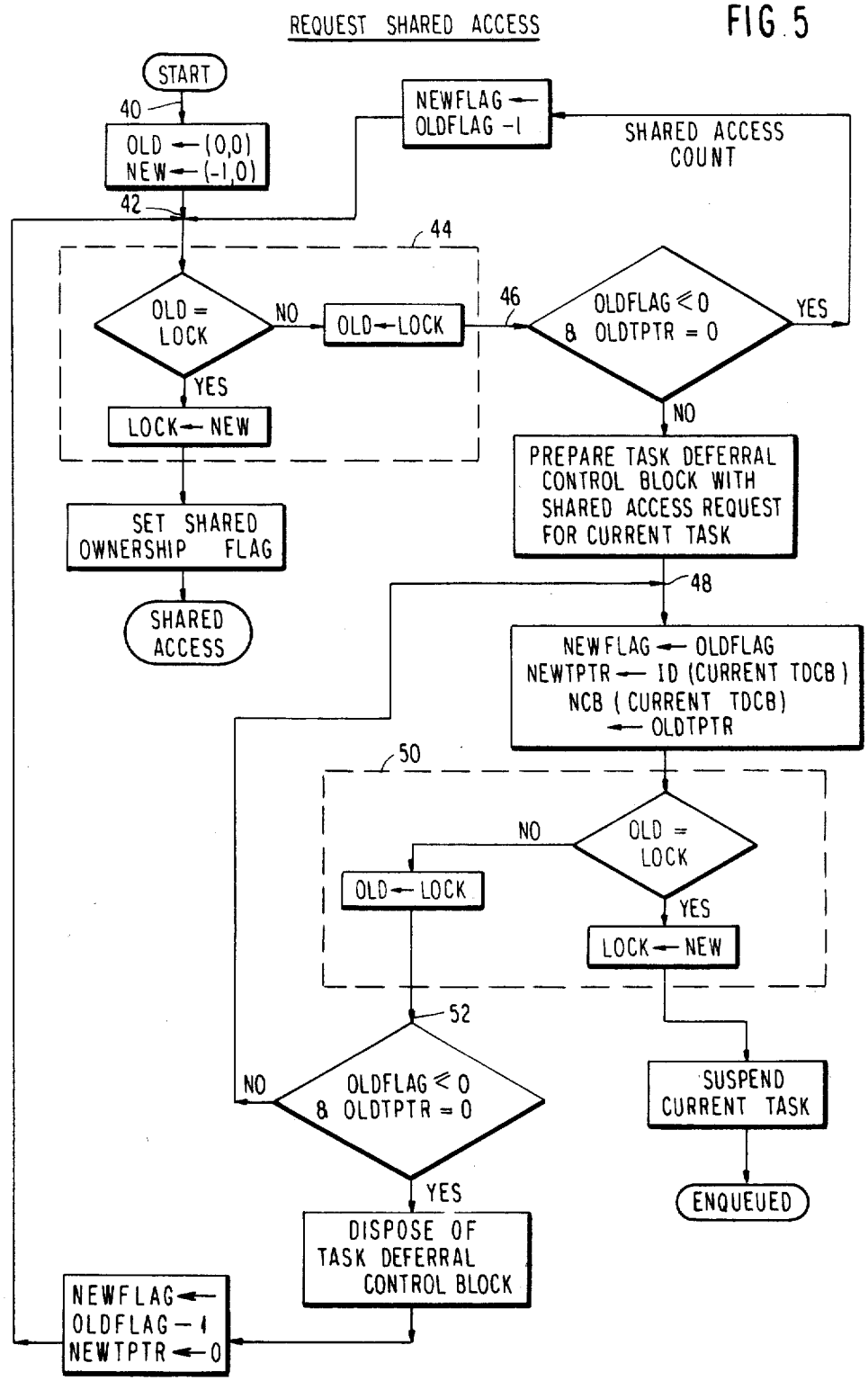
FIG. 5 is a flow diagram of the processing of a request for shared access to a resource.

The execution of a request for shared access, as illustrated by the flow diagram of FIG. 5, proceeds similarly to that for a request for exclusive access, except the case needs to be included in which the resource is currently under shared access but there is no queue currently existing so that the requesting task can gain shared access to the resource. As previously stated for a first-in/first-out queue, a shared acces request cannot jump ahead of an exclusive access request in the queue. Also, it is assumed that the resource can accommodate all requests for shared access if it is already under shared ownership so that the existence of a queue when the resource is shared implies that the top most senior least recently queued task in the queue is requesting exclusive access.

The execution for a request for shared access starts at point 40 with an initial prediction that the resource is not only available but that no other tasks currently are sharing access of that resource. The predicted value of LOCK, i.e., (0, 0), is placed into OLD. If this prediction is true, then upon successful storing by compare double and swap, shared access will have been established for this single task, LOCKFLAG will equal −1, indicating that there is only one task, the current task, in shared access of the resource. Furthermore, LOCKTPTR will be 0 because there will be no task deferral control blocks to point to. These two values are placed into NEW. At this point 42, an atomic reference 44 is performed with a compare double and swap. The lockword LOCK is fetched and compared with OLD and if the two double words match, the prediction is true and LOCK is replaced by the predicted new lockword NEW so that the request for shared access can immediately be honored. A shared ownership flag is set indicating shared ownership of the resource by the current task to allow abnormal termination recovery. Thereupon shared access is attained. However, if the prediction was not true so that OLD does not match LOCK, the value of the lockword is placed into OLD.

At this point 46, the failure of the prediction can be caused either by the existence of a queue which implies there is a more senior task requesting exclusive access already in the queue or there is no queue but one or more tasks already have access to the resource. If OLDFLAG≦0 and OLDTPTR=0, then there is no queue but the resource is already shared. The test for OLDFLAG being zero needs to be included at this point because the paths passing through this decision point 46 can originate from points other than the start 40. If the test is true so that there is no queue and no exclusive ownership of the the resource, the best guess for an updated value of LOCKFLAG would be its old value decremented by 1, indicating that one more task, i.e., the current task, has gained shared access to the resource. Therefore, NEWFLAG is replaced by OLDFLAG−1 and execution returns to point 42 for re-execution of the compare double and swap 44.

However, if OLDFLAG>0 or OLDTPTR-0, then the current task will need to be queued. A task deferral control block is prepared with an indication that shared access is requested for the current task. At this point 48, preparations are made to rearrange the queue based on the previously fetched lockword. NEWFLAG is replaced with the value of OLDFLAG. NEWTPTR points to the task deferral block of the current task by being replaced with its identification. The current task deferral control block points to the next most recently enqueued task deferral control block by the replacement of its NCB with OLDTPTR.

Then a new atomic reference 50 is made using compare double and swap. If the lockword has not since the last atomic reference, OLD matches LOCK and the lockword is updated by the predicted new lockword by replacing LOCK with NEW so that the current task is properly enqueued. The current task is then suspended awaiting availability of the resource for which it has been enqueued.

However, if the lockword fetched in the atomic reference 50 has been changed since the last atomic reference OLD does not match LOCK and OLD is replaced by the current lockword LOCK. This failed test may be due to the queue's disappearing since the last atomic reference and the resource being available or under shared ownership. In this case, which is tested by the conditions OLDFLAG ≦0 and OLDTPTR=0, it means that the current task can probably gain immediate shared access to the resource. Therefore, the task deferral control block is disposed of and the current LOCKFLAG is prospectively decremented by replacing NEWFLAG by OLDFLAG−1. Execution then returns to point 42 for re-exection of the atomic reference 44 using compare double and swap.

However, if the lockword has been modified but a queue still exists, or the resource is held in exclusive access, as indicated by OLDTPTR being loaded with a non-zero value or OLDFLAG being loaded with a positive value, respectively, an attempt to enqueue the current task is tried by returning execution to point 48. Just as was the situation for a request for exclusive access, a task will be properly enqueued if no other task has modified the lockword between consecutive executions of the atomic references 44 or 50.

When a task having access, either shared or exclusive, to a resource is ready to release its access to that resource, more is involved in the release of access than simply departing. The queue is maintained in proper form by assuring that upon each release of access, the lockword is properly updated and any task currently in the quene which should now gain access to the resource is taken out of the queue and given appropriate access. A further function is performed upon release and that is to deal with tasks which hav abnormally terminated since their task deferred control blocks entered the queue.

Figure 6:
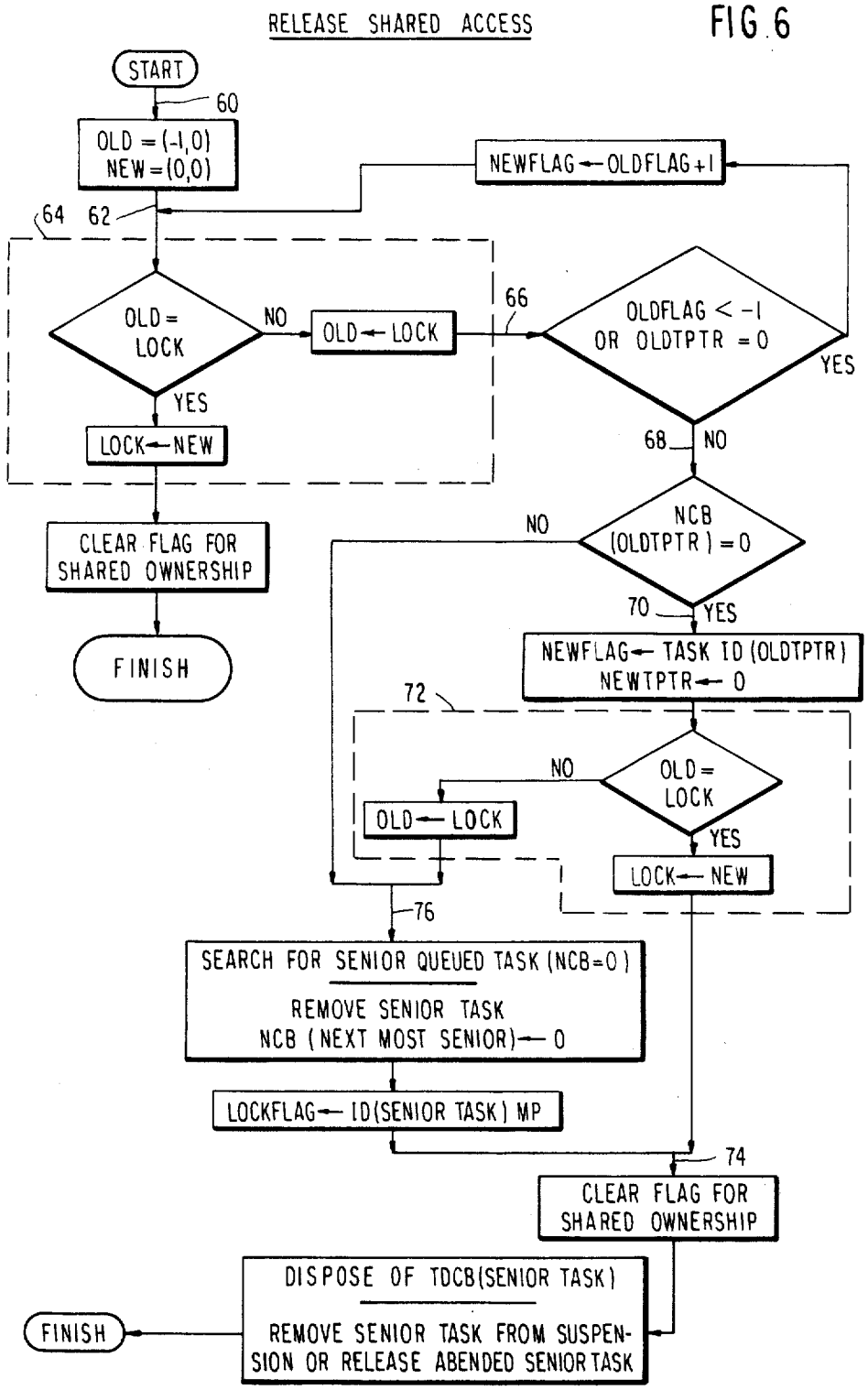
FIG. 6 is a flow diagram of the processing of a release of shared ownership of a resource.

The procedure for releasing shared access is illustrated in the flow diagram of FIG. 6. It should be kept in mind that when the resource is under shared ownership, if a queue exists, the top member of that queue is a request for exclusive access. Any more senior request for shared access would have been already honored. The execution of a release of shared access begins at the start 60 where an initial guess is made that not task is enqueued. This would be indicated by LOCKTPTR=0. It is further assumed that the task releasing shared access is the only task currently using the resource, as indicated by OLDFLAG=−1. If this prediction is true and the current task releases shared access, then the new lockword would indicate no use of the resource and no queue. Accordingly, both single words of NEW are set to 0. At this point 62, an atomic reference 64 is made by a compare double and swap. If the prediction is true so that OLD matches LOCK, then the lockword LOCK is replaced by NEW and the task seeking to release access has succeeded. The flag indicating shared ownership of the resource is cleared because this task is no longer sharing ownership of that resource. Thereafter the task is released and no further action needs to be performed because no tasks are enqueued.

If, however, the initial prediction was incorrect, then the test will be unsuccessful and the current value of the lockword is placed into OLD. At this point 66, a decision is made as to whether the prediction was wrong because there were other tasks sharing the resource or no queue existed by the conditions, OLDFLAG>−1 and OLDTPTR=0, respectively. The inclusion of the test for OLDTPTR is necessary because this decision point 66 may be reached from other directions than the start 60. If other shared access is to remain or if no tasks are enqueued, then preparations are made for the task to release shared access by prospectively incrementing the negative LOCKFLAG, that is, NEWFLAG is replaced by OLDFLAG+1 and execution returns to point 62. The execution of the atomic reference 64 will be successful if since its last execution no other task has gained or released shared access to or been enqueued for access to the resource. In the case where, in the interim, the releasing task has been left as the only task sharing access, the test for OLDTPTR=0 will again return execution to point 62. If, however, no interim changes have been made to either the access or the existence of a queue, the second execution of compare double and swap 64 releases the task from shared access with the resource still being shared by at least one task.

In the remaining case, the task seeking to release shared access is the last task having shared access to the resource and further tasks (the top, most senior, least-recently queued one being an exclusive request) are enqueued. Thus execution reaches point 68 and a decision is made as to whether only one task is presently enqueued, which would necessarily be a request for exclusive access. This decision is made by testing whether the next control block pointer NCB of the task deferral control statement pointed to by OLDTPTR is 0. If the test is successful, that is, OLDTPTR is 0, execution reaches point 70 and preparations are made to eliminate the queue by setting NEWFLAG to the identification of the task for the task deferral control block pointed to by OLDTPTR. As a result, the task for the task deferral control block at top of the queue will have exclusive access to the resource, and a value of NEWTPTR=0 indicates that no queue will exist on successful completion of the intended store by compare double and swap. Then an atomic reference 72 by a compare double and swap is performed. If the test is successful, LOCK is replaced by the value of NEW and execution proceeds to point 74 where the flag is cleared for shared ownership by the releasing task. The task deferral control block of the senior task in the queue is then disposed of. The senior task is removed from suspension or, if the senior task has abnormally terminated, a release of exclusive access to the resource is issued on its behalf. At this point, the processing for a release of shared access is completed.

If, however, the comparison in the atomic reference was unsuccessful, then OLD is replaced by LOCK. The lack of success can only be caused by an additional task joining the queue since the prior atomic reference 64 so that now at least two tasks are queued. At this point 76, the queue is searched for its most senior member by proceeding from the bottom of the queue to the top by way of the next control block pointers NCB until finally one is found for which NCB=0. The senior member of the queue is removed from the task by setting the NCB of the next most senior task deferral control block in the queue to 0. Then by an MP-consistent operation LOCKFLAG is replaced by the identification of the senior task in the queue. An MP-consistent operation is an atomic unit such that its partial execution cannot be seen by another MP-consistent operation, of which compare and swap is one example. With the change of LOCKFLAG, the senior member of the queue has been given access to the resource and execution continues from point 74 for clearing the flag, disposing of the task deferral control block, and removing the senior task from suspension.

If the initial test at point 68 for the queue consisting of a single task failed, execution proceeds to point 76 where the search is initiated for the senior queued task in the subsequent previously described operations.

Figure 8A:
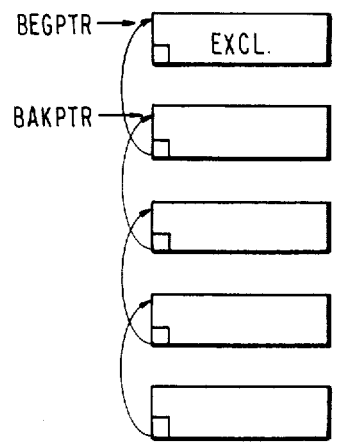
FIGS. 8(A) and 8(B) are pictorial illustrations of queues useful in understanding FIGS. 7 and 9.
Figure 8B:
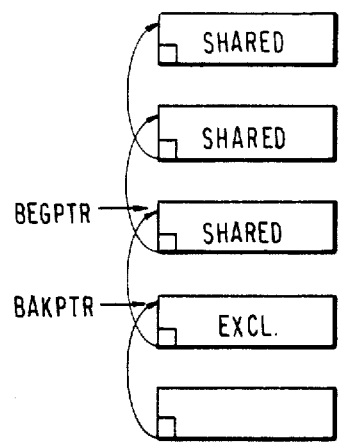

A release of exclusive access has the simplification that it is known that the releasing task is the only task currently owning the resource. However this simplification is more than compensated for by a lack of knowledge of the status of the top of the queue. The least recently enqueued task may be an exclusive request, as represented schematically by the queue of FIG. 8(A), in which case upon rearrangement the top member of the queue will gain exclusive access to the resource. Alternatively the top of the queue may be occupied by one or more requests for shared access, as shown by the queue of FIG. 8(B). If this is the case, all tasks senior to the top, least recently enqueued request for exclusive access will simultaneously be granted shared access to the resource.

The execution of a release of exclusive access is illustrated in the flow diagram of FIG. 7 and begins from the start 80. Because the resource is held exclusively, the value of OLDFLAG is necessarily the identification of the task attempting to release access. An initial guess is made that there are no tasks enqueued so that OLDTPTR is set to 0 in hope of matching LOCKTPTR. The corresponding value for NEW is (0, 0). An atomic reference 82 is made by a compare double and swap. If the guess was correct and OLD=LOCK, then the value of LOCK is replaced by NEW so that the lockword is replaced and exclusive access is successfully released. However, if the match was not true, then OLD is replaced by the value of LOCK because a queue of some sort existed.

Figure 9:
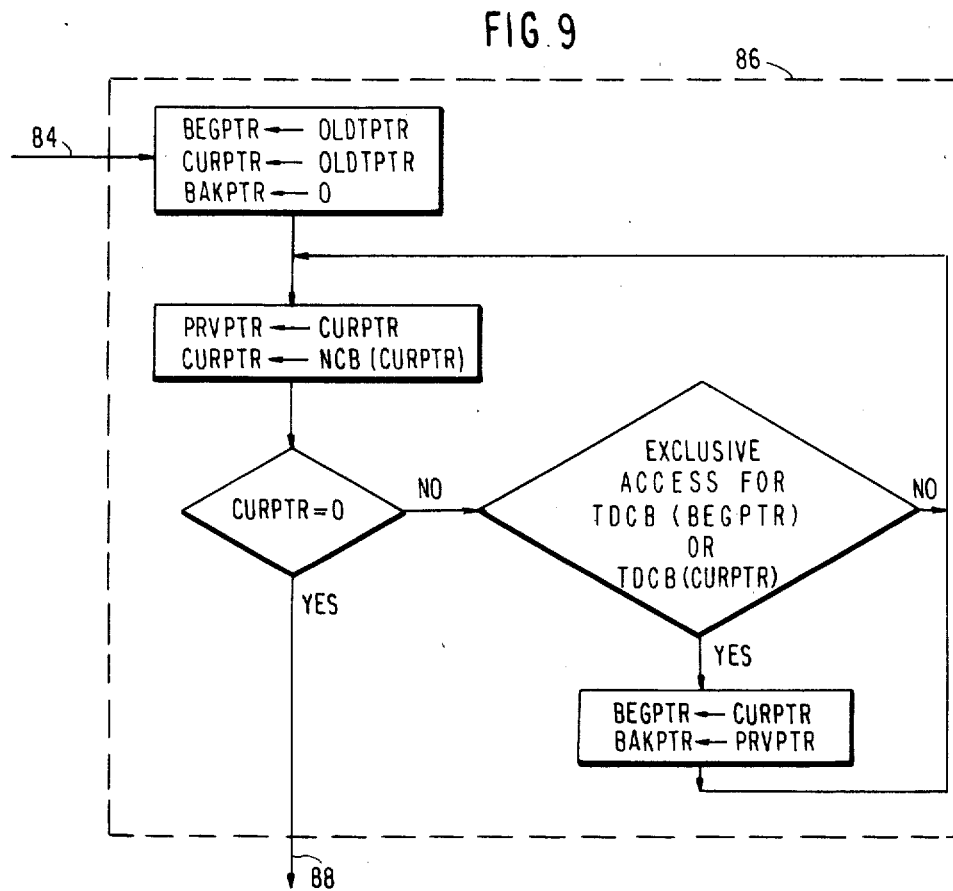
FIG. 9 is a flow diagram for the step of identifying the status of the queue of FIG. 7.

At this point 84, the details of the queue must be found. Parameters describing the queue are explained with reference to FIGS. 8(A) and 8(B). A group of tasks will be granted access to the resource. If the least recently enqueued task is an exclusive task, then BEGPTR will point to the task deferral control block of that senior and exclusive task. BAKPTR will point to the the task deferral control block of the next most senior, next least recently enqueued task, if any. If however, as illustrated in FIG. 8(B), one or more requests for shared access occupy the top of the queue, then BEGPTR points to the task deferral control block for the most recently enqueued of the requests for shared access at the top of the queue and BAKPTR points to the task deferral control block of the next most recently enqueued request, necessarily a request for exclusive access if a request exists. In both of these cases, if there are no other tasks in the queue, then BAKPTR=0. This information can be obtained in block 86 by the series of steps shown in the flow diagram of FIG. 9. The task deferral control blocks in the queue are interrogated beginning at the bottom of the queue to determine whether the task deferral control block indicates a request for exclusive access. An indication of exclusive access for the current or last task deferral control block causes the pointers BEGPTR and BAKPTR to be reset. The chain of the queue is followed by the next control block pointer NCB in each task deferral control block pointing to the next most recently enqueued task until the top of the queue is indicated by NCB=0 at which point 88 the current values of BEGPTR and BAKPTR point to the task deferral control blocks, as indicated in FIGS. 8(A) and 8(B).

Referring again to FIG. 7, at the point 88 where BEGPTR and BAKPTR have been identified, a test is made as to whether the task deferral control block pointed to by BEGPTR indicates a request for exlusive access. If the least recently enqueued task is a request for exclusive access, as illustrated in FIG. 8(A), then NEWFLAG is set to the task identification for the task of the task deferral control block pointed to BEGPTR. However, if BEGPTR points to a task deferral control block that does not indicate a request for exclusive access, as illustrated in FIG. 8(B), then NEWFLAG is set to the negative of the length of the chain of task deferral control blocks requesting shared access pointed to by BEGPTR. In the illustrated example in FIG. 8(B), this value of NEWFLAG would be −3. These two alternative values of NEWFLAG would be the values for LOCKFLAG for exclusive and shared access respectively once the queue has been re-arranged.

At the point 90 where NEWFLAG has been set to its proper value, a test is made as to whether a queue will exist after the intended re-arrangement of the queue. If BAKPTR≠0, a queue exists. In this case 92, the next control block pointer NCB of the task deferral control block pointed to by BAKPTR is set to 0, indicating that this task will become the least recently enqueued task in the queue and LOCKFLAG is set to NEWFLAG in an MP-consistent operation. At this point 94, the queue has been rearranged and all that remains to be done is a resumption of the suspended tasks, disposition of the no longer used task deferral control blocks and a release of access by abnormally terminated tasks in block 96.

If, however, BAKPTR=0 execution reaches point 98 indicating that no queue will be further necessary. In this case NEWTPTR is set to 0 to indicate the intended absence of a queue following atomic reference 100 with a compare double and swap. A successful test for OLD-=LOCK means that no rearrangement of the queue has occurred since the last atomic reference. In this case LOCK is set to NEW and execution reaches point 94 for the abnormal termination clean-up, disposition of the task deferral control blocks and resumption of suspended tasks. If, however, the test was unsuccessful, OLD is replaced by LOCK and execution returns to point 84 to once again find the status of the queue.

Figure 10:
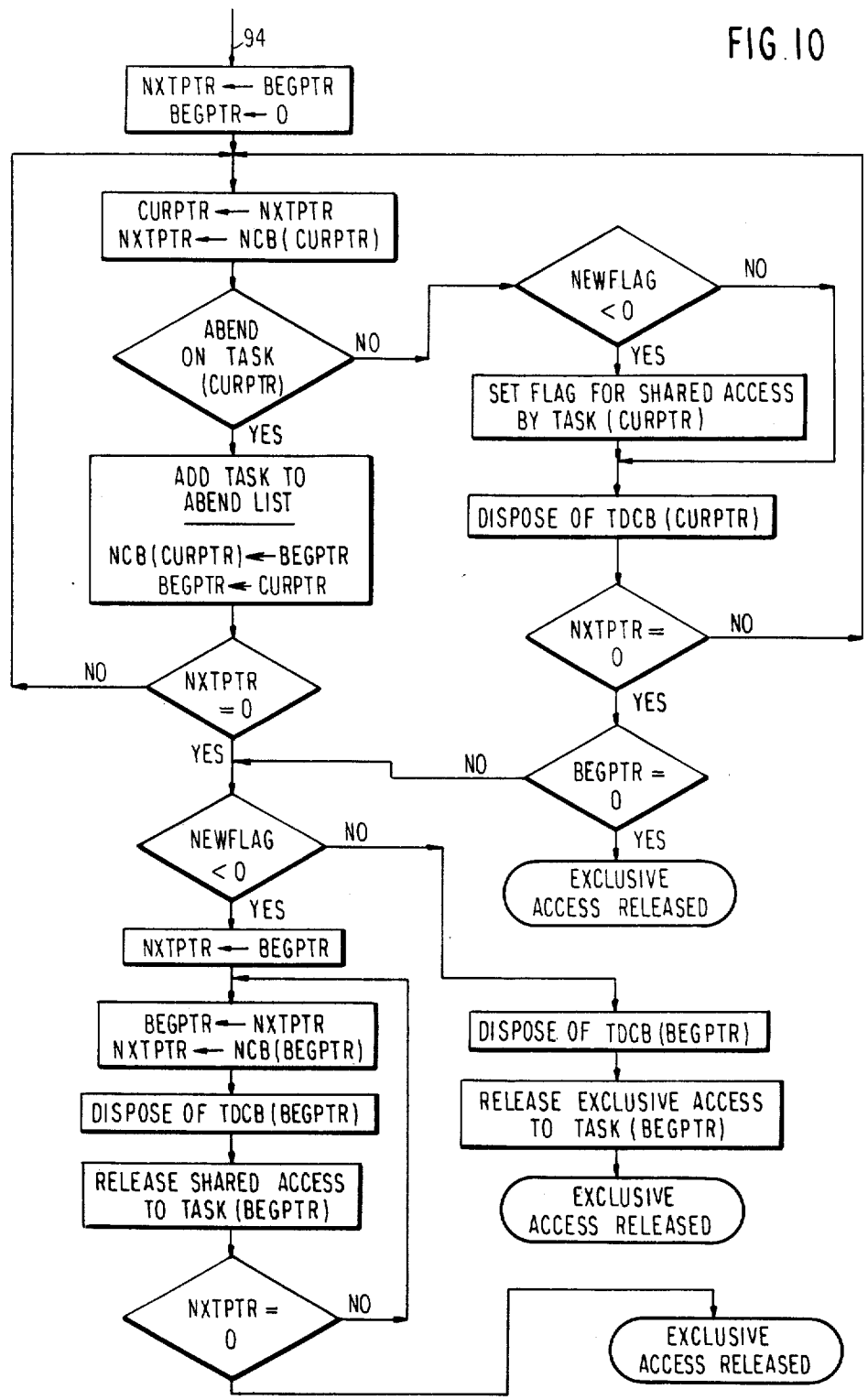
FIG. 10 is a flow diagram for the step of abnormal termination clean-up of FIG. 7.

The clean-up for abnormal terminations indicated in block 96 follows the flow diagram of FIG. 10. The purpose of the clean-up is to remove access for those tasks which have abnormally terminated (abended) while waiting in the queue for access to the resource. Every task which has been provisionally given access to the resource is examined to determine whether it has abnormally terminated. If it has, its task deferral control block is added to an ABEND list resembling the queue with its next control block pointer pointing to the next most recently queued task deferral control block, if any, in the ABEND list. If the task has not abnormally terminated, its execution is resumed, its task deferral control block is disposed of, and flags for shared access are set for each of those tasks which are to gain shared access. Finally, any abnormally terminated tasks have their access released and their task deferral control blocks disposed of.

It is to be appreciated, of course, that other embodiments of the invention exist than the one described here. Many of the described conventions can be arbitrarily changed. For instance, shared access could be denoted by a positive value of LOCKFLAG and exclusive access by a negative value. The order of LOCKFLAG and LOCKTPTR in the double-word LOCK is arbitrary. Indeed, a single word could be used for LOCK if individual bits or blocks of bits within the word can be set and tested.

Figure 1A:
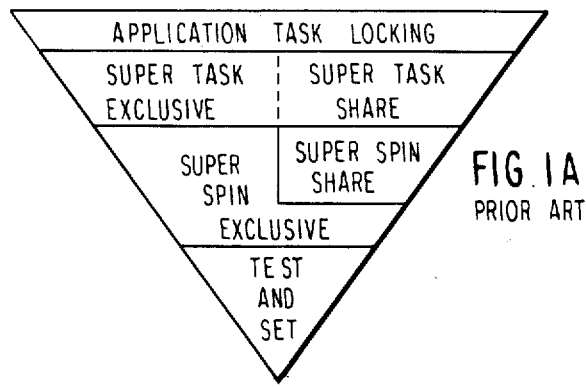
FIGS. 1(A) and 1(B) are illustrations of the hierarchy required by prior art application task locking.
Figure 1B:
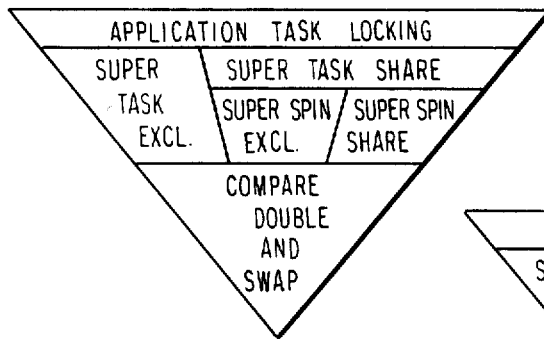
Figure 1C:
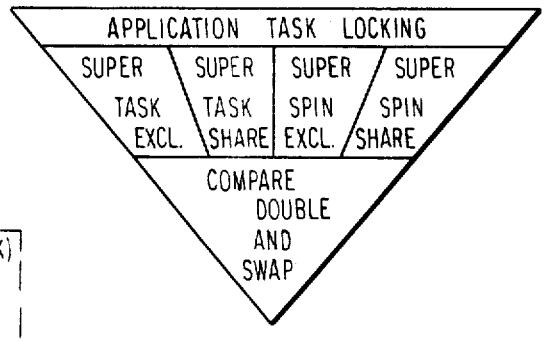
FIG. 1(C) is an illustration of the hierarchy involved in application task locking with the present invention.

Thus there have been described methods to request or release both shared and exclusive access to a resource using the atomic reference, compare double and swap. The hierarchy of task locking using these methods can be illustrated by the hierarchy shown in FIG. 1(C). The application task locking can use either a supervisor task exclusive or supervisor task share based on the compare double and swap forming the fundamental operation of the task lock. Thus the hierarchy involves only three levels of operation for either exclusive or shared tasks, a simplification over prior art task locking.

Multi-task, multiprocessor applications can make use of this form of locking for the control of queues and resources between tasks within such applications. The location of the lockword for each resource so controlled must be known to each appropriate task and to its associated processing for abnormal termination. This reduces the hierarchy to only two levels of operation for such applications. Among the resources so controlled can be queues of lockwords. Such applications can thus provide their own symbolic lock processing and locking hierarchies at a substantial performance improvement over the use of corresponding services within the supervisor. Additionally, single-thread, multi-task applications, those consisting of tasks with their own form of dispatching, which currently have their own symbolic lock processing and locking hierarchies, can be converted to multitask, multi-processor operation. This results in a greater processing capability without the loss of performance or function gained by having their own symbolic lock processing and locking hierarchies.

It is seen that the supervisor task lock can be accomplished without spin-locks except as may be required when suspending or resuming task execution. Of course, supervisor spins are possible with compare double and swap. The advantages of the absence of spinning within the described methods are the elimination of the associated cost in performance, the ability to exploit this form of locking directly from multi-task, multi-processor applications, and a reduction in the concern for recovery from the CPU failure in which a spin-lock is held by the failing CPU.

Further advantages of the described methods are the very short path lengths required to obtain the lock when no conflict exists over the initial estimate of the status of the queue. This short pathlength is due in part to the initial guess for either request for access or release that the resource is not otherwise engaged. This short path length is also due to the economy of using access to the resource to provide that control of access required for manipulation of the first-in/first-out queue which is not provided by the atomic nature of compare double and swap. Another advantage of the described methods is that no free storage allocation for or preparation of task deferral control blocks or the like is required for access when the resource is immediately available.

Certain disadvantages do exist for the task locking methods described for this invention. If the owning task of a resource abnormally terminates, ABEND processing is required to know the location of each double word used as a resource identifier. The ABEND processing must release access of the resources on behalf of the task being terminated. The primary disadvantage for a shared resource access with this form of locking is the requirement that some form of flag associated with each task must be set to indicate shared ownership when held.

I claim:

1. A method for aquisition and release of access to each of plural resources in a multi-programming system, the method comprising:
   providing a first-in/first-out (FIFO) queue of elements in which each element is respectively associated with a request waiting for access to a resource,
   associating each resource with a respective lockfield in a location known by and accessible to all programs wanting to use the resource, said lockfield containing a lockflag and a lockpointer, the lockflag indicating a type of access granted to said resource, and the lockpointer locating a most recently enqueued element in the queue, the lockpointer indicating whether or not a queue exists, and if the queue exists identifying the most recently enqueued element, each element in the queue (except a least recently enqueued element) having a pointer to a next less recently enqueued element in the queue, and the pointer for the least recently enqueued element having an indicator identifying the element as the least recently enqueued element,
   granting one or more share requests for non-exclusive use of the resource to concurrently access the resource, but allowing only a single exclusive request for exclusive use of the resource to access the resource at a time,
   controlling the lockflag to indicate the type of access currently granted to the resource, in which the lockflag is set to one of the following states: (1) a shareable usage state, (2) an exclusive usage state, or (3) a no existing access state representing no assignment of the resource to any request,
   providing a shareable or exclusive usage indicator field in each element in the queue for indicating whether a request associated with the element is waiting for shareable or exclusive usage of the resource when the usage would conflict with access to the resource by previous requests not yet released.

2. A method for aquisition of access as defined in claim 1 for a share request, further comprising:
   atomically testing the lockfield by each share request for access to the resource to determine if the lockflag indicates a no existing access state, and granting the share request immediate access to the resource if the atomic test finds that the lockpointer indicates an empty queue while the lockflag indicates a no existing access state.

3. A method for aquisition of access as defined in claim 2 for a share request, in which the lockflag found by the atomic test indicates that exclusive usage of the resource exists, or the lockpointer found by the atomic test indicates that a queue exists, further comprising:

atomically attempting an enqueueing of a new element having a share request indicator into the queue as a most recent element when the lockfield does not differ from the value found by the last atomic test or last atomic enqueueing attempt, but not enqueueing the new element when the lockfield differs from the value found by the last atomic test or the last atomic enqueueing attempt, repeating the atomic enqueueing attempt when unsuccessful so long as the the lockflag found by the last atomic enqueueing attempt indicates exclusive use of the resource or the lockpointer found by the last atomic enqueueing attempt indicates a queue exists.

4. A method for aquisition of access as defined in claim 3 for a share request, further comprising the steps of:

suspending a program, or a part thereof, associated with the new element put in the queue for the share request.

5. A method for aquisition of access as defined in claim 2 for a share request, further comprising:

atomically attempting the granting of immediate access to the resource for the share request and increasing by one the magnitude of a count indication provided with the share flag in the lockfield when the lockflag found by the last atomic test or atomic granting attempt indicates no exclusive usage of the resource exists and the lockpointer found by the last atomic test or atomic granting attempt indicates no queue exists, if the lockfield does not differ from the value found by the last atomic test or the last atomic granting attempt, repeating the atomic granting attempt when unsuccessful so long as the lockflag found by the last atomic granting attempt indicates no exclusive usage of the resource exists and the lockpointer found by the last atomic granting attempt indicates no queue exists.

6. A method for aquisition of access as defined in claims 2, 3, or 5 for a share request, further comprising:

forming a new element when the lockflag found by the last atomic test or the last atomic granting attempt indicates exclusive usage of the resource exists or the lockpointer found by the last atomic test or the last atomic granting attempt indicates a queue exists, disposing of the new element, and preparing values for a new lockfield comprising a new lockflag with a share flag and a new lockpointer indicating no queue exists when the lockflag found by the last atomic enqueuing attempt indicates no exclusive usage of the resource exists and the lockpointer found by the last atomic enqueuing attempt indicates no queue exists.

7. A method for release of access after aquisition of access as defined in claims 2, 3, 4, or 5 for a share request, in which a program was granted sharable access to a resource, has completed use of the resource, and is required to release access to the resource by a release process, comprising:

a second atomic test of the content of the lockfield setting the lockflag to a no request state to release use of the resource if the lockflag is found to indicate a single share request and the lockpointer indicates no queue exists, but not releasing the shareable use of the resource if the lockpointer found by the second atomic test indicates a queue exists or if the lockflag found by the second atomic test indicates access to the resource exists for more than one share request.

8. A method for releasing access to a resource as defined in claim 7 for a share request, further comprising:

atomically attempting to change the lockflag by decreasing by one the count indication in the lockflag when the lockflag found by the last second atomic test or atomic change attempt indicates shareable access to the resource by more than one share request or the lockpointer found by the last second atomic test or atomic change attempt indicates no queue exists, if the lockfield does not differ from the value found by the last second atomic test or attempted atomic lockflag change, repeating the attempted atomic change when unsuccessful so long as the lockflag found by the last attempted atomic change indicates shareable access to the resource by more than one share request or the lockpointer found by the last attempted atomic change indicates no queue exists.

9. A method for releasing access to a resource as defined in claim 8 for a share request in which the lockflag found by the last second atomic test or the last attempted atomic change indicates shareable use of the resource by exactly one share request and the lockpointer found by the last second atomic test or the last attempted atomic change indicates no queue exists, further comprising:

fetching a pointer field in the most recently enqueued element located by the lockpointer, determining if the pointer field indicates the most recently enqueued element is also the lease recently enqueued element in the queue, wherein the least recently enqueued element in the queue is an element for an exclusive request and is the only element in the queue, the determining operation otherwise finding more than one element in the queue, but searching the queue by using the pointer field in each element until the least recently enqueued element is found, if the determining operation determines that more than one element exists in the queue.

10. A method for releasing access to a resource as defined in claim 9 for a share request, in which the determining operation finds only one element in the queue, further comprising:

atomically setting the lockflag to an exclusive flag representing the least recently enqueued element found by the determining operation and setting a no queue value in the lockpointer, only if the lockfield does not differ from the value found by the last second atomic test or the last attempted atomic change.

11. A method for releasing access to a resource as defined in claim 9 for a share request, in which the determining operation finds more than one element in the queue, further comprising:

finding both a least recently enqueued element which must be for an exclusive request in the queue and a next least recently queued element in the queue, making the next recently enqueued element the least recently enqueued element by setting a least recently enqueued element indicator into that element, setting the lockflag to an exclusive flag representing the least recently enqueued element found.

12. A method for aquisition of access to a resource as defined in claim 1 for an exclusive request, further comprising:

atomically testing the lockfield by each exclusive request for access to the resource to determine if the lockflag indicates a no request state, granting the exclusive request immediate access to the resource if the lockpointer indicates an empty queue and the lockflag indicates a no request state, atomically enqueueing a new element for the exclusive request into the queue as a most recent element when the lockfield does not differ from the value found by the last atomic testing or the last atomic enqueueing operation, but not enqueueing a new element for the exclusive request into the queue as a most recent element when the lockfield differs from the value found by the last atomic testing or the last atomic enqueueing operation, repeating the atomic enqueueing operation when the lockfield differs from the value found by the last atomic testing or the last atomic enqueueing operation so long as the lockpointer found by the last atomic testing or the last atomic enqueueing operation indicates a queue exists or the lockflag found by the last atomic testing or the last atomic enqueueing operation does not indicate a no request state.

13. A method for aquisition of access to a resource as defined in claim 12 for an exclusive request, in which the atomic enqueueing operation was successful, further comprising:

suspending a program, or a part thereof, associated with the new element put in the queue for the exclusive request by the atomic enqueueing step.

14. A method for aquisition of access to a resource as defined in claim 12 for an exclusive request, in which the atomic testing operation granted immediate access to the resource, further comprising:

recording a program identifier as an exclusive flag type of lockflag to identify an associated program, or a part thereof, which made the exclusive request currently having access to the resource.

15. A method for release of access after aquisition of access as defined in claims 12, 13 or 14 for an exclusive request, in which a program having an exclusive request is granted access to the queue, has completed a current need for exclusive use of the resource, and is required to release access to the resource by a release process, comprising:

atomically setting the lockflag to indicate a no existing access state if the lockpointer indicates an empty queue.

16. A method for the release of access to a resource as defined in claim 15 for an exclusive request, in which the atomic setting operation did not find a lockpointer indicating an empty queue, further comprising:

examining each element in the queue for an indication that the element is for an exclusive or a share request, recording a pointer to any next least recently enqueued element during the examining operation when the least recently enqueued element is for an exclusive request, recording a pointer to any least recently enqueued element for an exclusive request and counting any elements in any contiguous sequence of elements for share requests in which the sequence includes the least recently enqueued element during the examining operation when the least recently enqueued element is for a share request, atomically changing the lockflag to a share flag having a count indication representing the share element count indication and setting the lockpointer to indicate no queue exists when the least recently enqueued element was for a share request and no element for an exclusive request existed in the queue, so long as the lockfield does not differ from the value found by the last atomic setting or the last atomic changing operation, repeating the examining, recording, and atomic changing operations when the lockfield was found by the atomic changing operation to differ from the value found by the last atomic setting or atomic changing operation, atomically replacing the lockflag with an exclusive request state and replacing the lockpointer to indicate no queue exists when the only enqueued element was for an exclusive request, so long as the lockfield does not differ from the value found by the last atomic setting or the last atomic replacing operation, repeating the examining, recording, and atomic replacing operations when the lockfield was found by the atomic replacing operation to differ from the value found by the last atomic setting or atomic replacing operation.

17. A method for the release of access to a resource as defined in claim 16 for an exclusive request, in which either the atomic changing operation or the atomic replacing operation was successful, further comprising:

resuming a program, or a part thereof, associated with each element in the queue prior to the atomic changing operation.

18. A method of releasing access to a resource as defined in claim 16 for an exclusive request, in which the least recently enqueued element is for an exclusive request and is not the only enqueued request, further comprising:

making the next least recently enqueued element the least recently enqueued element by setting a least recently enqueued indicator in that element, setting the lockflag to an exclusive access state for the program for which the previously least recently enqueued element was prepared.

19. A method of releasing access to a resource as defined in claim 16 for an exclusive request, in which the least recently enqueued element is for a share request and an exclusive request exists in the queue, further comprising:

making the least recently enqueued element for an exclusive request the least recently enqueued element by setting a least recently enqueued indicator in that element, setting the lockflag to indicate a shareable access state and setting the count indication of the lockflag to the count of share request elements which followed the least recently enqueued element for an exclusive request.

20. A method for releasing access to a resource as defined in claim 10 for a share request, in which the atomic setting operation was successful, further comprising:

resuming a program, or a part thereof, associated with the element in the queue prior to the atomic setting operation.

21. A method for releasing access to a resource as defined in claim 11 for a share request, further comprising:
  resuming a program, or a part thereof, associated with the previously least recently enqueued element in the queue.

22. A method for releasing access to a resource as defined in claim 18 for an exclusive request, further comprising:
  resuming a program, or a part thereof, associated with the previously least recent element in the queue.

23. A method of releasing access to a resource as defined in claim 19 for an exclusive request, further comprising:
  resuming a program, or a part thereof, associated with each share request element previously in the queue following the least recently enqueued element for an exclusive request.

24. A method for aquisition and release of access to a resource as defined in claim 1, further comprising:
  making the share flag a count of the number of requests concurrently having access to the resource,
  and making the exclusive flag an identifier of a program making the request, in which the share flag and exclusive flag have opposite arithmetic signs.

25. A method for aquisition and release of access to a resource as defined in claim 24, further comprising:
  providing a negative arithmetic sign with each share flag,
  and providing a positive arithmetic sign with each exclusive flag.

26. A method for releasing access to a resource as defined in claim 10 for a share request, in which the atomic setting operation finds the lockfield differs from the value found by the last second atomic test or attempted atomic change, further comprising:
  finding both a least recently enqueued element which must be for an exclusive request in the queue and a next least recently queued element in the queue for a share or exclusive request,
  making the next recently enqueued element the least recently enqueued element by setting a least recently enqueued element indicator into that element,
  setting the lockflag to an exclusive flag representing the previously least recently enqueued element.

27. A method for aquisition of access to a resource as defined in claim 12 for an exclusive request, further comprising:
  forming a new element when the lockflag found by the last atomic test indicates usage of the resource exists or the lockpointer found by the last atomic test indicates a queue exists,
  disposing of the new element, and preparing values for a new lockfield comprising a new lockflag with an exclusive flag and a new lockpointer indicating no queue exists when the lockflag found by the last atomic enqueuing attempt indicates no usage of the resource exists and the lockpointer found by the last atomic enqueuing attempt indicates no queue exists.

* * * * *